(12) United States Patent
Elzur et al.

(10) Patent No.: US 8,010,707 B2
(45) Date of Patent: *Aug. 30, 2011

(54) SYSTEM AND METHOD FOR NETWORK INTERFACING

(75) Inventors: Uri Elzur, Irvine, CA (US); Frankie Fan, Diamond Bar, CA (US); Steven B. Lindsay, Mission Viejo, CA (US); Scott S. McDaniel, Villa Park, CA (US)

(73) Assignee: Broadcom Corporation

( * ) Notice: Subject to any disclaimer, the term of this patent is extended or adjusted under 35 U.S.C. 154(b) by 1119 days.

This patent is subject to a terminal disclaimer.

(21) Appl. No.: 10/652,330

(22) Filed: Aug. 29, 2003

(65) Prior Publication Data

US 2004/0093411 A1    May 13, 2004

Related U.S. Application Data

(60) Provisional application No. 60/477,279, filed on Jun. 10, 2003, provisional application No. 60/478,106, filed on Jun. 11, 2003, provisional application No. 60/408,617, filed on Sep. 6, 2002, provisional application No. 60/407,165, filed on Aug. 30, 2002, provisional application No. 60/456,265, filed on Mar. 30, 2003, provisional application No. 60/456,260, filed on Mar. 20, 2003, provisional application No. 60/410,022, filed on Sep. 11, 2002, provisional application No. 60/411,294, filed on Sep. 17, 2002, provisional application No. 60/408,207, filed on Sep. 4, 2002, provisional application No. 60/434,503, filed on Dec. 18, 2002, provisional application No. 60/419,354, filed on Oct. 18, 2002, provisional application No. 60/420,901, filed on Oct. 24, 2002, provisional application No. 60/439,951, filed on Jan. 14, 2003, provisional application No. 60/442,360, filed on Jan. 24, 2003, provisional application No. 60/425,959, filed on Nov. 12, 2002, provisional application No. 60/456,266, filed on Mar. 20, 2003, provisional application No. 60/437,887, filed on Jan. 2, 2003, provisional application No. 60/456,322, filed on Mar. 20, 2003.

(51) Int. Cl.
*G06F 15/16* (2006.01)
(52) U.S. Cl. ........................................ 709/250; 709/249
(58) Field of Classification Search .................. 709/229, 709/230, 250, 249
See application file for complete search history.

(56) References Cited

U.S. PATENT DOCUMENTS 6,226,680 B1 * 5/2001 Boucher et al. ............... 709/230

(Continued)

OTHER PUBLICATIONS

Microsoft, Winsock Direct and Protocol Offload on SANs, Mar. 3, 2001, download.microsoft.com/download/1/6/1/161ba512-40e2-4cc9-843a-923143f3456c/WinsockDirect-ProtocolOffload.doc.*

(Continued)

*Primary Examiner* — Patrice L Winder
*Assistant Examiner* — Hieu Hoang
(74) *Attorney, Agent, or Firm* — McAndrews, Held & Malloy, Ltd.

(57) ABSTRACT

Systems and methods that network interface are provided. In one embodiment, a data center may be provided that may include, for example, a first tier, a second tier and a third tier. The first tier may include, for example, a first server. The second tier may include, for example, a second server. The third tier may include, for example, a third server. At least one of the first server, the second server and the third server may handle a plurality of different traffic types over a single fabric.

11 Claims, 15 Drawing Sheets

U.S. PATENT DOCUMENTS

| | | | |
|---|---|---|---|
| 6,253,334 B1 * | 6/2001 | Amdahl et al. | 714/4.12 |
| 6,446,109 B2 | 9/2002 | Gupta | |
| 6,529,963 B1 | 3/2003 | Fredin et al. | |
| 6,535,518 B1 | 3/2003 | Hu et al. | |
| 6,597,956 B1 | 7/2003 | Aziz et al. | |
| 6,675,200 B1 * | 1/2004 | Cheriton et al. | 709/212 |
| 6,807,581 B1 * | 10/2004 | Starr et al. | 709/250 |
| 6,988,150 B2 * | 1/2006 | Matters et al. | 710/36 |
| 7,010,607 B1 * | 3/2006 | Bunton | 709/228 |
| 7,089,293 B2 * | 8/2006 | Grosner et al. | 709/217 |
| 7,142,540 B2 * | 11/2006 | Hendel et al. | 370/392 |
| 7,194,519 B1 * | 3/2007 | Muhlestein et al. | 709/215 |
| 2001/0021949 A1 * | 9/2001 | Blightman et al. | 709/219 |
| 2001/0023460 A1 | 9/2001 | Boucher et al. | |
| 2001/0037406 A1 * | 11/2001 | Philbrick et al. | 709/250 |
| 2001/0049740 A1 * | 12/2001 | Karpoff | 709/231 |
| 2002/0059451 A1 * | 5/2002 | Haviv | 709/238 |
| 2002/0065924 A1 * | 5/2002 | Barrall et al. | 709/227 |
| 2002/0120763 A1 | 8/2002 | Miloushev et al. | |
| 2003/0014544 A1 * | 1/2003 | Pettey | 709/249 |
| 2003/0018787 A1 * | 1/2003 | Neal et al. | 709/227 |
| 2003/0046330 A1 * | 3/2003 | Hayes | 709/201 |
| 2003/0046396 A1 | 3/2003 | Richter et al. | |
| 2003/0084185 A1 * | 5/2003 | Pinkerton | 709/236 |
| 2003/0084397 A1 * | 5/2003 | Peleg | 714/770 |
| 2003/0140124 A1 * | 7/2003 | Burns | 709/220 |
| 2003/0145230 A1 * | 7/2003 | Chiu et al. | 713/201 |
| 2003/0191932 A1 * | 10/2003 | Allen et al. | 713/150 |
| 2004/0010674 A1 * | 1/2004 | Boyd et al. | 711/170 |
| 2004/0030668 A1 * | 2/2004 | Pawlowski et al. | 707/1 |
| 2004/0213205 A1 * | 10/2004 | Li et al. | 370/352 |

OTHER PUBLICATIONS

Satran et al. draft-ietf-ips-iscsi-07.txt. Jul. 20, 2001. 77 pages.*

* cited by examiner

SYSTEM AND METHOD FOR NETWORK INTERFACING

CROSS-REFERENCE TO RELATED APPLICATIONS/INCORPORATION BY REFERENCE

This application makes reference to, claims priority to and claims benefit from U.S. Provisional Patent Application Ser. No. 60/477,279, entitled "System and Method for Network Interfacing in a Multiple Network Environment" and filed on Jun. 10, 2003; U.S. Provisional Patent Application Ser. No. 60/478,106, entitled "System and Method for Network Interfacing" and filed on Jun. 11, 2003; U.S. Provisional Patent Application Ser. No. 60/408,617, entitled "System and Method for TCP/IP Offload" and filed on Sep. 6, 2002; U.S. Provisional Patent Application Ser. No. 60/407,165, entitled "System and Method for TCP Offload" and filed on Aug. 30, 2002; U.S. Provisional Patent Application Ser. No. 60/456,265, entitled "System and Method for TCP Offload" and filed on Mar. 30, 2003; U.S. Provisional Patent Application Ser. No. 60/456,260, entitled "System and Method for Handling Out-of-Order Frames" and filed on Mar. 20, 2003; U.S. Provisional Patent Application Ser. No. 60/410,022, entitled "System and Method for TCP Offloading and Uploading" and filed on Sep. 11, 2002; U.S. patent application Ser. No. 10/298,817, entitled "System and Method for TCP Offloading and Uploading" and filed on Nov. 18, 2002; U.S. Provisional Patent Application Ser. No. 60/411,294, entitled "System and Method for Handling Partially Processed Frames" and filed on Sep. 17, 2002; U.S. patent application Ser. No. 10/302,474, entitled "System and Method for Handling Frames in Multiple Stack Environments" and filed on Nov. 21, 2002; United States Provisional Patent Application Ser. No. 60/408,207, entitled "System and Method for Fault Tolerant TCP Offload" and filed on Sep. 4, 2002; U.S. patent application Ser. No. 10/337,029, entitled "System and Method for Fault Tolerant TCP Offload" and filed on Jan. 6, 2003; U.S. Provisional Patent Application Ser. No. 60/405,539, entitled "Remote Direct Memory Access over TCP/IP using Generic Buffers for Non-Posting TCP" and filed on Aug. 23, 2002; U.S. Provisional Patent Application Ser. No. 60/398,663, entitled "Dual TCP/IP Stacks Connection Management for Winsock Direct (WSD)" and filed on Jul. 26, 2002; U.S. Provisional Patent Application Ser. No. 60/434,503, entitled "System and Method for Handling Multiple Stack Environments" and filed on Dec. 18, 2002; U.S. patent application Ser. No. 10/336,983, entitled "System and Method for Handling Multiple Stack Environments" and filed on Jan. 6, 2003; U.S. Provisional Patent Application Ser. No. 60/403,817, entitled "One Shot RDMA Having Only a 2 Bit State" and filed on Aug. 14, 2002; U.S. Provisional Patent Application Ser. No. 60/404,709, entitled "Optimizing RDMA for Storage Applications" and filed on Aug. 19, 2002; U.S. patent application Ser. No. 60/419,354, entitled "System and Method for Statistical Provisioning" and filed on Oct. 18, 2002; U.S. patent application Ser. No. 60/420,901, entitled "System and Method for Statistical Provisioning" and filed on Oct. 24, 2002; U.S. patent application Ser. No. 60/439,951, entitled "System and Method for Statistical Provisioning" and filed on Jan. 14, 2003; U.S. patent application Ser. No. 60/442,360, entitled "System and Method for Statistical Provisioning" and filed on Jan. 24, 2003; U.S. Provisional Patent Application Ser. No. 60/425,959, entitled "Joint Memory Management for User Space and Storage" and filed on Nov. 12, 2002; U.S. Provisional Patent Application Ser. No. 60/456,266, entitled "Self-Describing Transport Protocol Segments" and filed on Mar. 20, 2003; U.S. Provisional Patent Application Ser. No. 60/437,887, entitled "Header Alignment and Complete PDU" and filed on Jan. 2, 2003; U.S. Provisional Patent Application Ser. No. 60/456,322, entitled "System and Method for Handling Transport Protocol Segments" and filed on Mar. 20, 2003; and U.S. patent application Ser. No. 10/230,643, entitled "System and Method for Identifying Upper Layer Protocol Message Boundaries" and filed on Aug. 29, 2002.

The above-referenced United States patent applications are hereby incorporated herein by reference in their entirety.

FIELD OF THE INVENTION

Certain embodiments of the invention relate to interfaces for networks. More specifically, certain embodiments of the invention relate to a method and system for network interfacing.

BACKGROUND OF THE INVENTION

More information is being processed and stored as network traffic (e.g., Internet traffic) continues to grow at an astonishing rate. The average size of a file or a message continues to increase as larger amounts of data are generated, especially with respect to media rich files and messages. Consequently, more servers and more storage are being employed. To deal with the deluge of information, Data Centers used by Enterprises or Internet Service Providers (ISPs) have gained in popularity. Data Centers are high-density computing configurations generally characterized by high performance, low power and minimal real estate requirements.

FIG. 1 shows a general arrangement for a Data Center in three tiers, although in some cases the tiers may be collapsed. The first tier interfaces the external network (e.g., a local area network (LAN) or a wide area network (WAN)) and directly serves the clients that typically run transmission control protocol/Internet protocol (TCP/IP) applications (e.g., hypertext transport protocol (HTTP) 1.0 and HTTP 1.1). The first tier has static information from which it can draw via its direct attached storage (DAS). To satisfy requests for dynamic content or for transactions, the first tier interfaces with the second tier servers. The second tier is also known as the Application Tier and has multiple communication requirements: high performance storage access for content typically serviced over a Fibre Channel Storage Area Network (SAN); communication with first tier servers over LAN with TCP/IP over Ethernet; communication with the third tier for data base access with a low latency, low central processing unit (CPU) utilization fabric such as a Virtual Interface Architecture (VIA) for clustering and Interprocess Communication (IPC). Second tier servers often communicate among themselves for load sharing and concurrent execution of the application. Hence, a second tier machine may employ three different fabrics: LAN, SAN and clustering. A similar description is applicable to the third tier. Hence, each server has a collection of adapters to serve its requirements for networking, storing and clustering. Such requirements produce systems with substantial power and space requirements.

The three separate networks are quite different from each other. Cluster, small computer system interface (SCSI) for DAS and Fibre Channel use Host Bus Adapters (HBAs) and operate directly on application data and run complete layer 2 (L2), layer 3 (L3), layer 4 (L4) and layer 5 (L5) protocol processing stacks within on-board computers. These programs are large (typically greater than 100 KB) and computationally quite intensive. Furthermore, these programs expect large amounts of memory to operate. Additional adapters are also required for clustering/disk accesses. Block level storage access requires a dedicated network to run the SCSI command set (e.g., SCSI-architecture-model-2 (SAM-2)) on a dedicated cable (e.g., DAS) or a specialized infrastructure like Fibre Channel to satisfy unique requirements to provide high bandwidth, low latency and robustness. Clustering usually employs a specialized adapter that supports a very low latency network infrastructure that is usually proprietary. It also uses a special software interface to the operating system (OS) to minimize host overhead by employing OS Kernel bypass techniques. As these different networks have evolved separately with their own unique requirements, separate adapter cards were needed.

As density requirements for servers increase, as evidenced by the use of Server Blades in servers, the space required for the three different types of adapters is becoming less available. The problem is further exacerbated since additional adapters may be used to provide fault tolerance or load balancing. Furthermore, financial considerations tend to drive organizations to seek a lower Total-Cost-of-Ownership (TCO) solution. The cost of managing three different fabrics and the toll on the information technology (IT) departments which must provide personnel trained in multiple technologies are substantial burdens to bear.

FIGS. 2 and 3 show conventional HBA arrangements and illustrate data and control flow. The HBA used for Fibre Channel and SCSI implements the complete protocol stack on the HBA and exposes the OS to a SCSI-like interface such as, for example, a command descriptor block (CDB). This places the burden of implementation of the complete conversion from an application memory down to the wire protocol on the adapter. Consequently, a large CPU with a large attached memory is used. The large attached memory is used to store the CPU program, transmit (TX) data, receive (RX) data as well as copies of host control structures.

Remote direct memory access (RDMA) adapters for clustering such as used in Infiniband systems have similar architectures with even greater requirements for local memory to keep a copy of a memory translation table and other control structures.

Until recently, TCP/IP was not considered a feasible solution as it runs in software which generally involves more CPU overhead and high latencies. Furthermore, TCP/IP does not guarantee all segments are received from the wire in the order that they were transmitted. Consequently, the TCP layer has to re-order the received segments to reconstruct the originally transmitted message. Nevertheless, protocols have been developed that run on TCP/IP. For example, Internet SCSI (iSCSI) places the SCSI command set on top of TCP/IP. In another example, iWARP places the IPC technology of RDMA on top of TCP/IP.

FIGS. 4 and 5 show conventional servers. In FIG. 4, each type of traffic has its respective subsystem. For example, the storage subsystem has its own Ethernet connector, its own storage HBA and its own driver. The conventional server may even include one or more proprietary network interfaces. FIG. 5 shows another conventional server in which a layer 4/layer 5 (L4/L5) Ethernet switch is employed to reduce the number of Ethernet connectors. However, the conventional server still employs separate adapters and network interface cards (NICs). Furthermore, the conventional server may still employ a proprietary network interface which cannot be coupled to the L4/L5 Ethernet switch.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in, for example, systems and methods that provide network interfacing. In one embodiment, the present invention may provide a data center. The data center may include, for example, a first tier, a second tier and a third tier. The first tier may include, for example, a first server. The second tier may include, for example, a second server. The third tier may include, for example, a third server. At least one of the first server, the second server and the third server may handle a plurality of different traffic types over a single fabric.

In another embodiment, the present invention may provide a server. The server may include, for example, an integrated chip and an Ethernet connector. The Ethernet connector may be coupled to the integrated chip. The Ethernet connector and the integrated chip may handle, for example, a plurality of different types of traffic.

In yet another embodiment, the present invention may provide a method for communicating with a server. The method may include, for example, one or more of the following: using a single fabric for a plurality of different types of traffic; and handling the plurality of different types of traffic via a single layer 2 (L2) connector of the server.

In yet still another embodiment, the present invention may provide a method for communicating in a data center. The method may include, for example, one or more of the following: accessing a storage system over a single fabric; accessing a cluster over the single fabric; and accessing a network over the single fabric.

These and other advantages, aspects and novel features of the present invention, as well as details of an illustrated embodiment thereof, will be more fully understood from the following description and drawings.

DETAILED DESCRIPTION OF THE INVENTION

Figure 1:
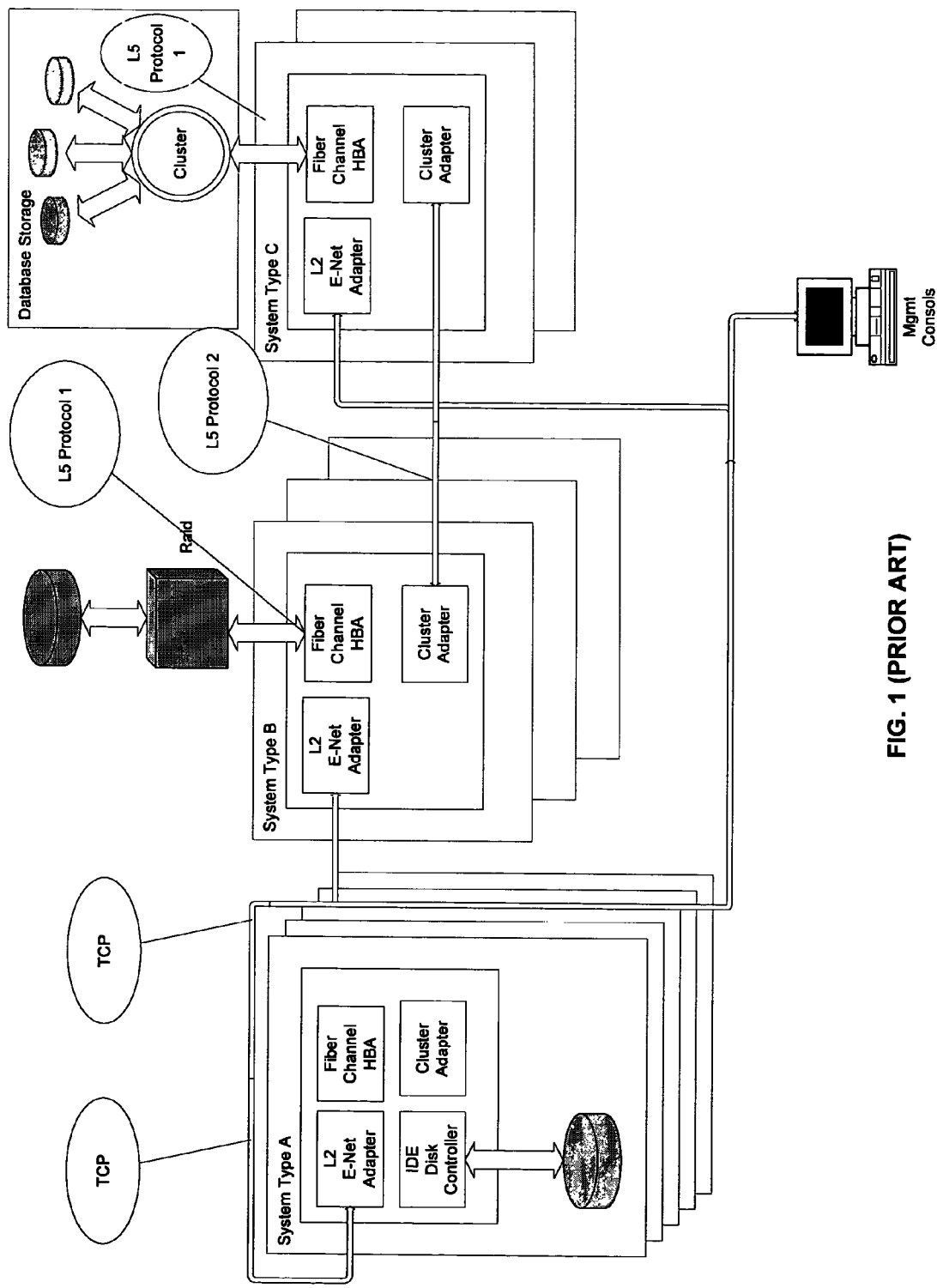
FIG. 1 shows a general arrangement for a Data Center in three tiers.
Figure 2:
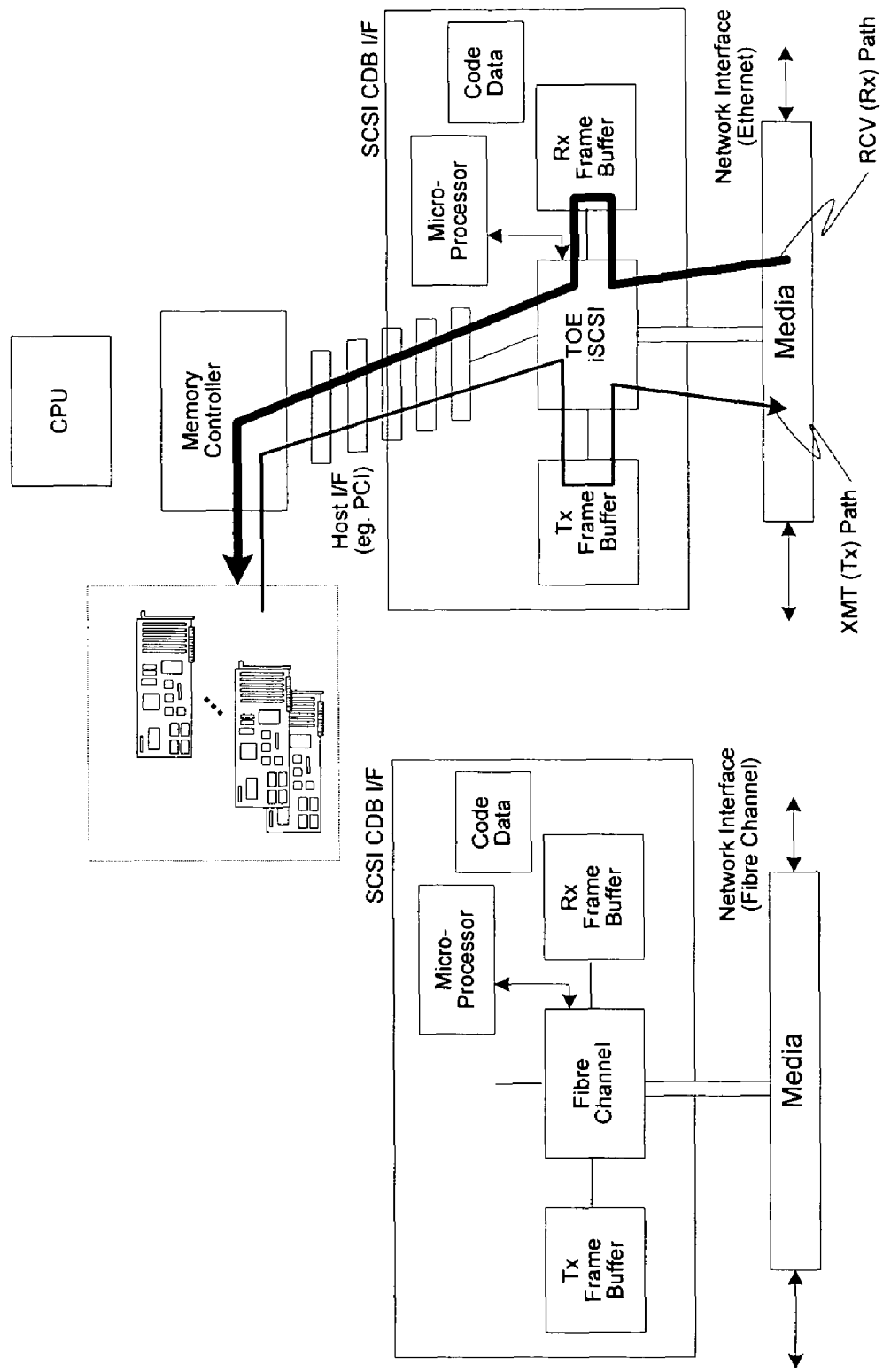
FIG. 2 shows conventional host bus adapter (HBA) arrangements.
Figure 3:
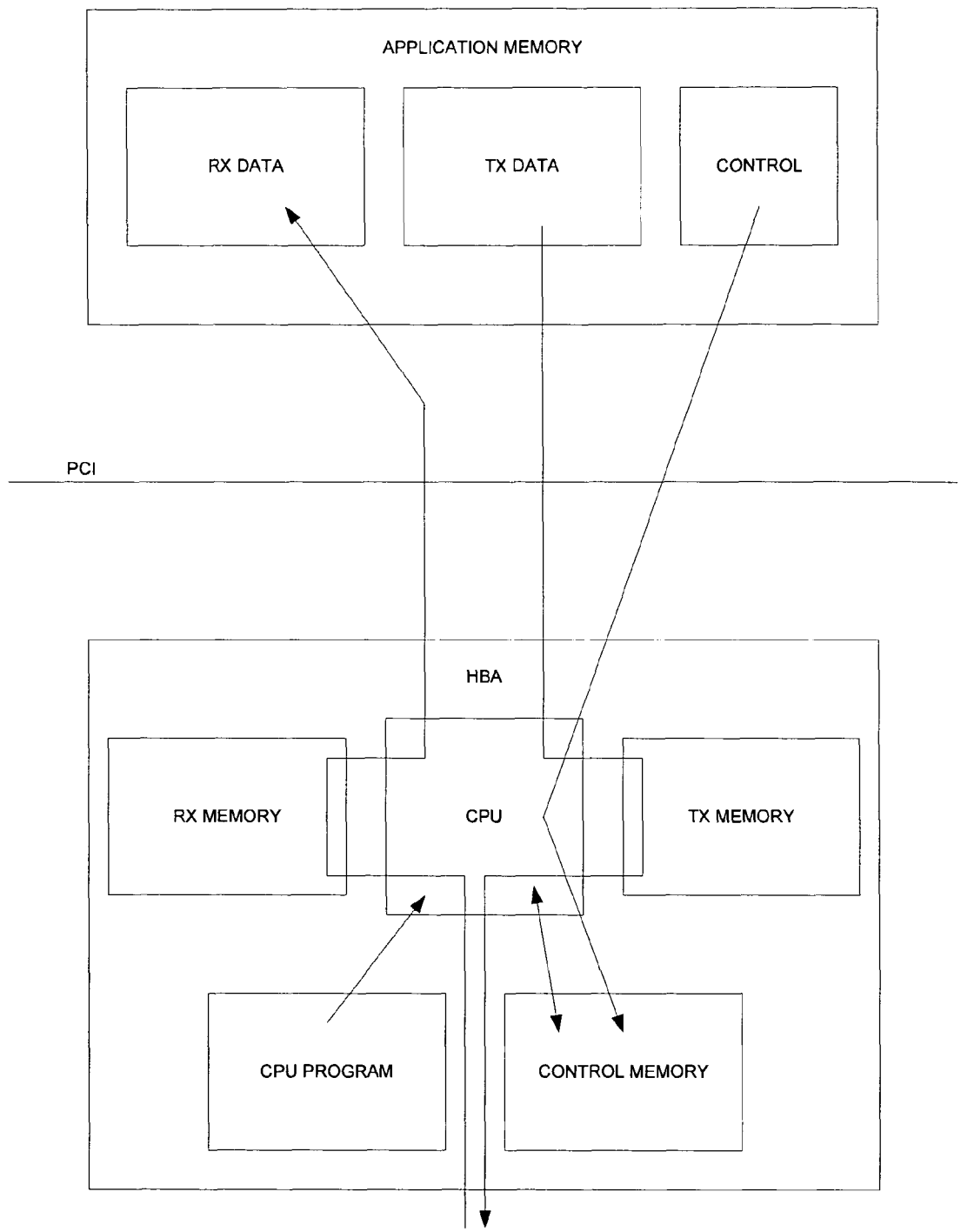
FIG. 3 shows a conventional HBA arrangement.
Figure 4:
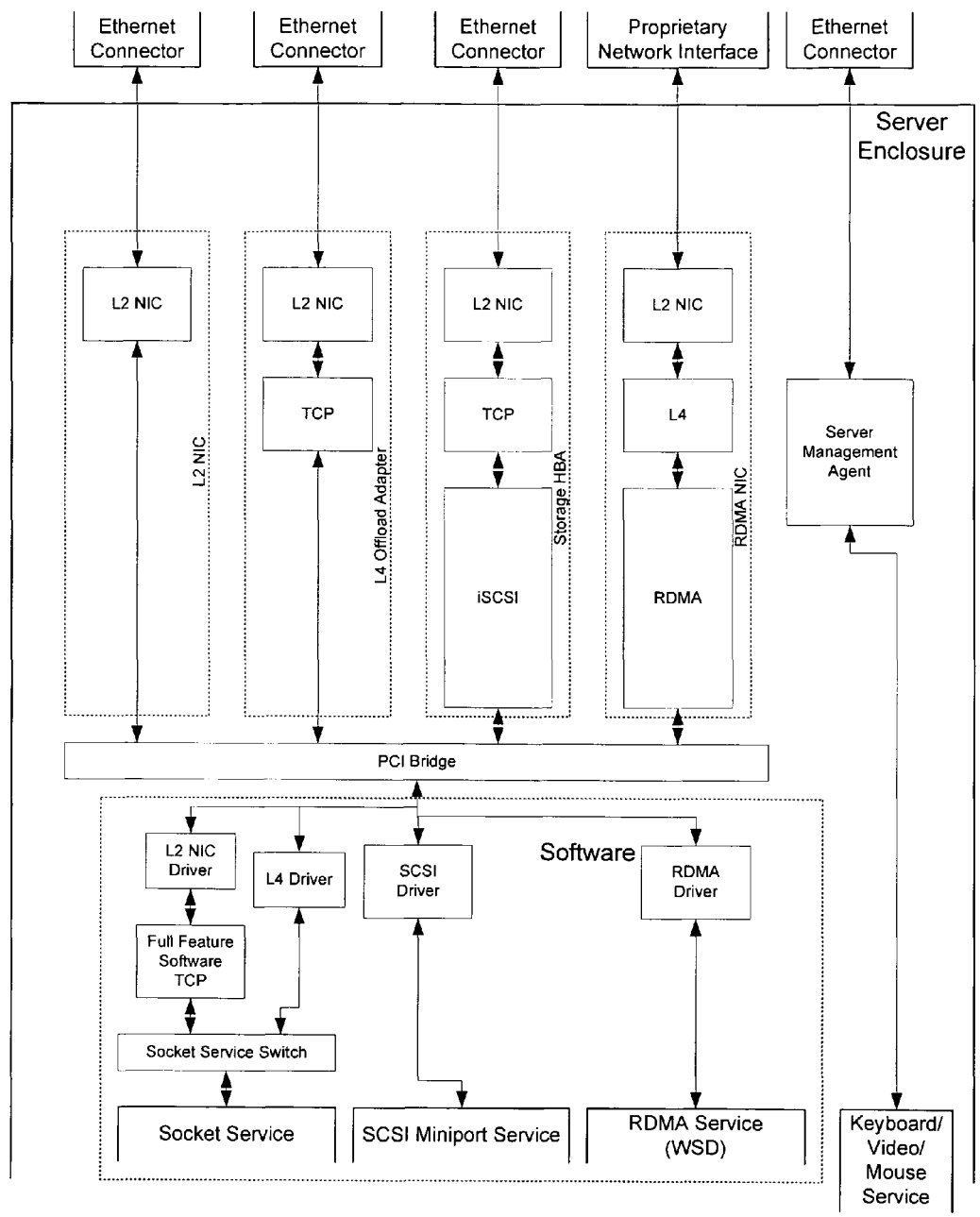
FIG. 4 shows a conventional server.
Figure 5:
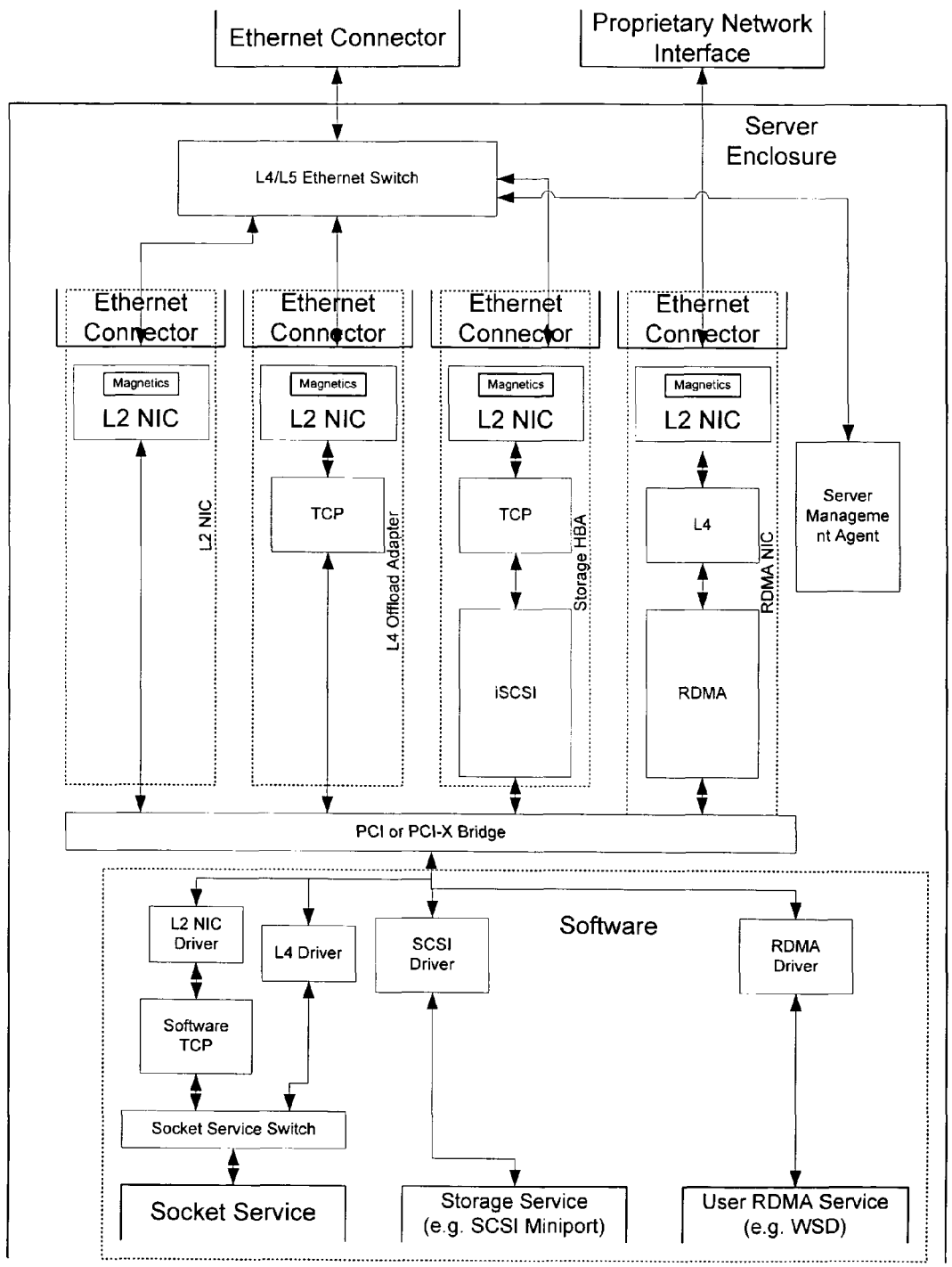
FIG. 5 shows another conventional server.

Aspects of the present invention may be found in, for example, systems and methods that provide network interfacing. Some embodiments according to the present invention provide a device that can handle all the communication needs of a computer (e.g., a server, a desktop, etc.) The device may use protocols that are running on transmission control protocol/Internet protocol (TCP/IP) such as, for example, TCP/IP/Ethernet. Storage traffic may be handled using an Internet small computer system interface (iSCSI) protocol which relies on TCP as the transport and may employ a TCP offload engine to accelerate its operation. Clustering traffic may be handled using a remote direct memory access (RDMA) protocol that runs on top of TCP. Clustering may be combined into the same device as TCP offload. Further convergence may be achieved if the iSCSI protocol uses the RDMA fabric.

Some embodiments according to the present invention may provide for the convergence of three fabrics into a single TCP/IP/Ethernet-based fabric. The present invention also contemplates the convergence of more or less than three fabrics into a single TCP/IP/Ethernet-based fabric. One device may be placed on a motherboard and may support, for example, local area network (LAN), storage area network (SAN), network attached storage (NAS) and Cluster/Interprocess Communication (IPC). The device may allow for flexible resource allocation among the different fabrics and may allow for an implementation in which space is limited (e.g., a Server Blade environment). For example, a single device may replace, for example, three subsystems. Technology may be implemented using a single back plane to convey all types of traffic instead of three different protocols each requiring three dedicated lanes. Such technology may reduce cost and complexity as well as save on space.

Some embodiments according to the present invention provide an architectural approach (e.g., a multiple-in-one approach) in which storage, clustering and network requirements that need or otherwise would benefit from hardware acceleration are identified and implemented in hardware. Some aspects of complex processing may still be handled by the host. The multiple-in-one device may provide savings in silicon, processing power and memory requirements. Furthermore, the cost of each implementation and space used by each implementation may be substantially reduced such that features and functions may be combined on a single chip.

Some embodiments according to the present invention provide for a flow-through network interface card (NIC). The flow-through NIC may be optimized to minimize the resources used to handle different traffic types and different interfaces. For example, an iSCSI state may be kept mainly on a host memory. The host memory may be used, for example, for buffering of incomplete or uncommitted TCP, iSCSI or clustering data. Information tracking this data may be loaded into the single chip as needed. Consequently, the program on the adapter may be substantially smaller and use less central processing unit (CPU) power and memory.

Some embodiments according to the present invention may provide that some time-consuming mechanisms (e.g., per byte processing) may be performed in hardware. Some examples of time-consuming processes include, for example, header-data separation, zero-copy service to application buffers, data integrity checks and digests, and notification optimizations.

Some embodiments according to the present invention may provide for mode coexistence. On-chip resources (e.g., a context memory) that are used to keep the state information may be used with substantial flexibility based upon, for example, the needs of the host. The host may control the number of connections used for each communication type. The number of bytes used to store the context varies by connection type (e.g., TCP, TCP and IPSec, iSCSI on TCP, iSCSI on RDMA, and RDMA) and by number of outstanding activities (e.g., the number of windows/regions, RDMA Reads, Commands, etc.) The host may control the context size per connection, thereby further optimizing the device utility. The device may also be fully compatible with existing LAN controllers. LAN traffic may be supported concurrently with TCP offload, iSCSI and RDMA traffic.

Figure 6:
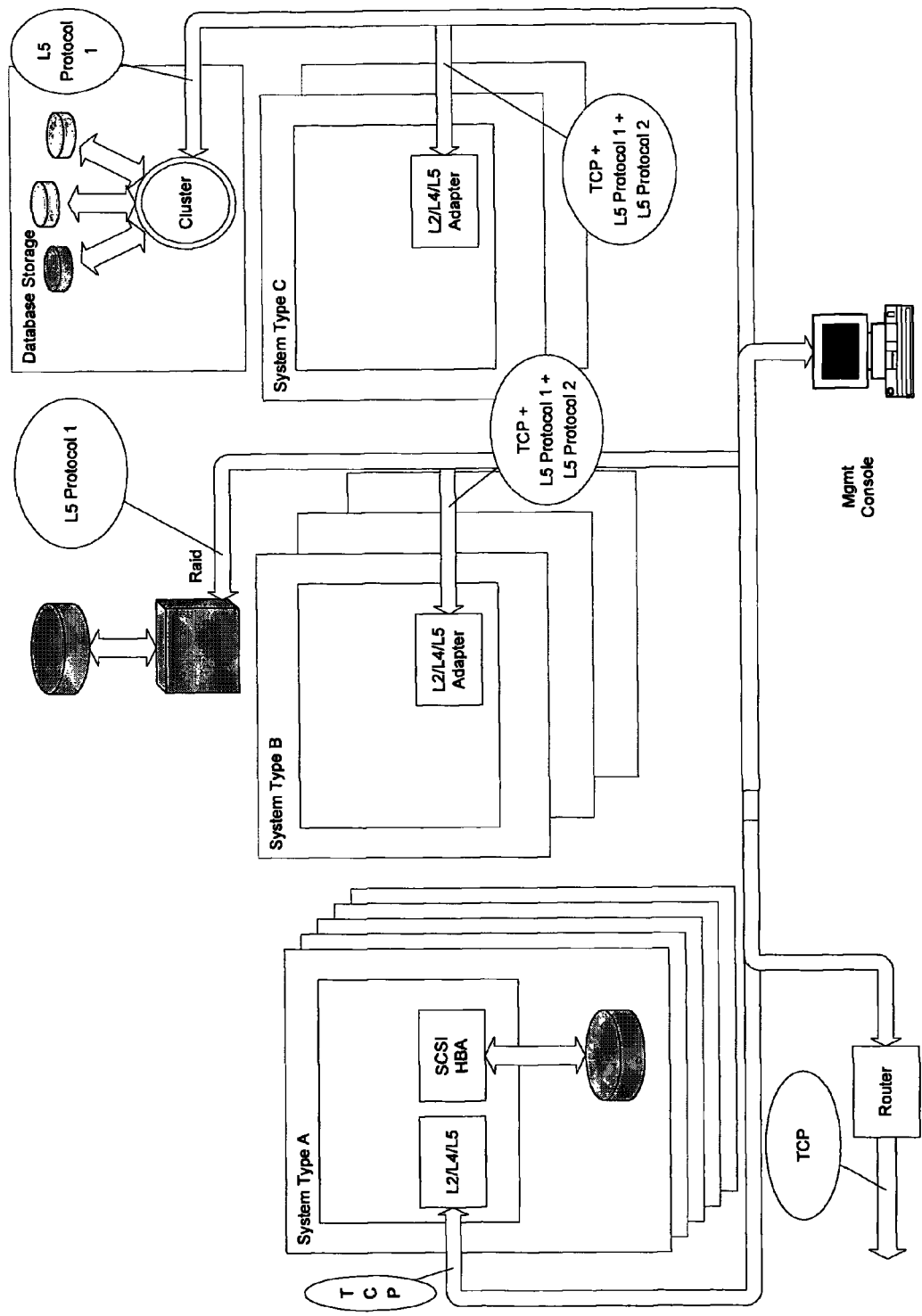
FIG. 6 shows a representation illustrating an embodiment of a Data Center according to the present invention.

FIG. 6 shows a representation illustrating an embodiment of a Data Center according to the present invention. The Data Center is illustrated as a three tier architecture, however, the present invention also contemplates architectures with more or less than three tiers. In each tier, a server is shown with a layer 2/layer 4/layer 5 (L2/L4/L5) adapter. The single adapter may handle, for example, network traffic, storage traffic, cluster traffic and management traffic. In one embodiment according to the present invention, the single fabric may be based on TCP/IP. As a consequence of using a single L2/L4/L5 adapter for a particular server or server blade, the particular server or server blade may have a single IP address.

Figure 7:
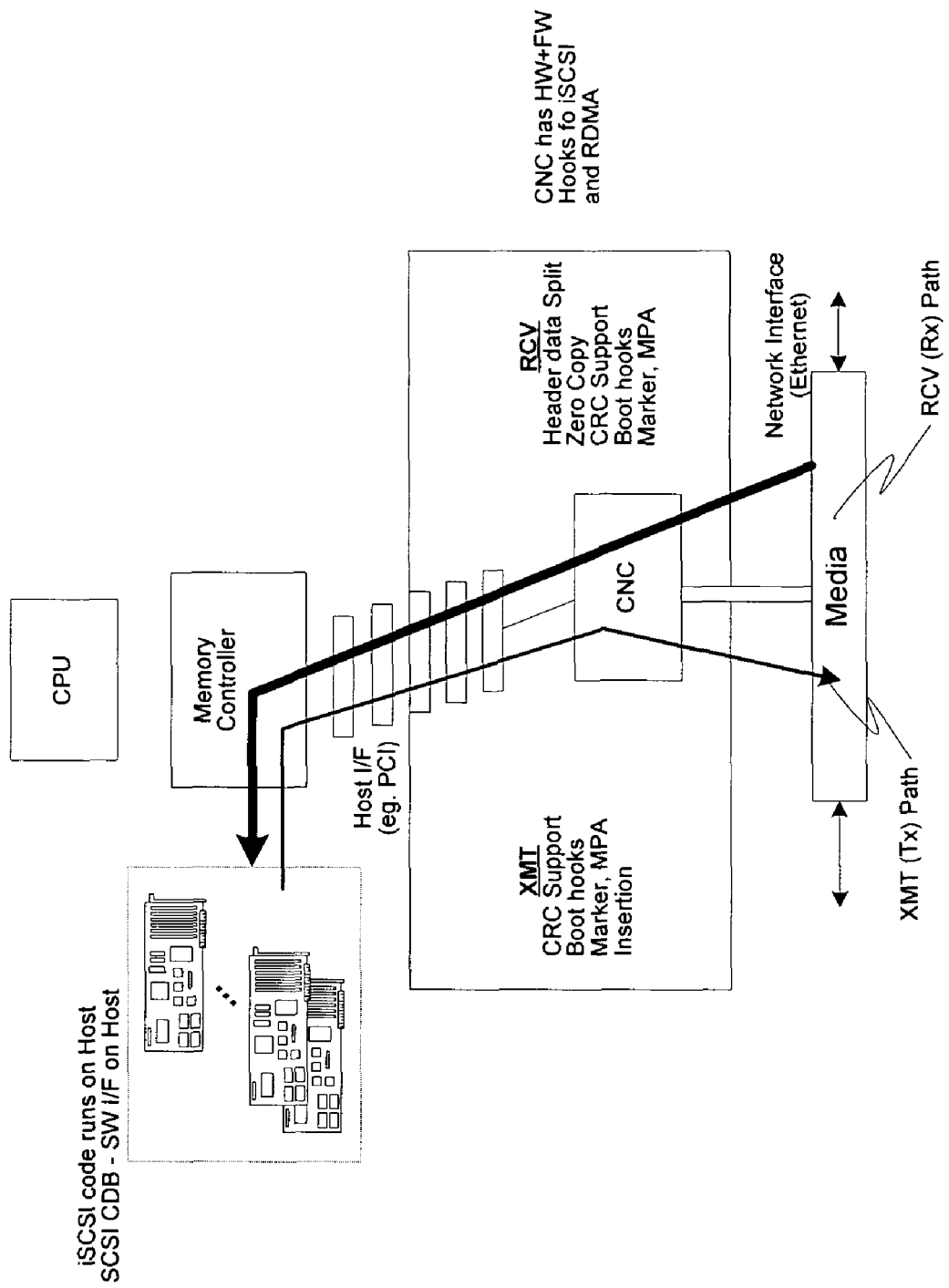
FIG. 7 shows a representation illustrating an embodiment of a converged network controller (CNC) architecture and a host system according to the present invention

FIG. 7 shows a representation illustrating an embodiment of a converged network controller (CNC) architecture and a host system according to the present invention. The CNC architecture may be adapted to provide a flow-through NIC. In one embodiment, the CNC architecture provides a TCP enabled Ethernet controller (TEEC) that provides TCP offload services. Hardware, firmware and software may be added to provide layer 5 (L5) functionality. Protocols such as iSCSI and RDMA may be considered L5 technologies. Unlike conventional host bus adapter (HBA) architectures, the CNC architecture may provide for a different functionality split according to some embodiments of the present invention.

iSCSI may provide, for example, control functions and data transfer functions. The control functions may include, for example, discover, security, management, login and error recovery. The data transfer portion may build iSCSI protocol data units (PDUs) from the SCSI CDBs it gets from the operating system (OS) and may submit them to the iSCSI peer for execution. An iSCSI session might include multiple TCP connections with each carrying commands, data and status information. For each connection, iSCSI may keep state information that is updated by iSCSI PDUs transmitted or received. The CNC architecture may keep all of this data on the host, thereby saving the costs and complexity of running it on the CNC. This also may overcome the limitations imposed by the limited memory available on a conventional HBA. The software interface may be exposed to the OS may be similar or identical to a conventional HBA. For example, the CNC may support the same SCSI miniport or Stor Port interface as in a Microsoft OS. The CNC may partition the work between the SCSI miniport running on the host and the CNC hardware differently from a conventional HBA.

An embodiment of a hardware interface to the CNC for iSCSI operations according to the present invention is set forth below.

During transmission, the host may get the SCSI CDB and the iSCSI context for a connection and may then construct an iSCSI command with or without data. The host may transfer to the CNC an iSCSI PDU without the Digest(s) and the marker. A separate header and payload digest may be used. A cyclical redundancy check (CRC) such as CRC32c may be used. Specific fields in the PUD may carry the CRC results. The fields may also provide for a finite-interval marker (FIM) or other types of markers. The marker may be a 32-bit construct that may be placed in the TCP byte stream in a predetermined interval that is possibly negotiated during login. The CNC may construct TCP segments that carry the iSCSI PDUs, may compute the CRC, may insert the CRC in the corresponding fields and may insert the marker. Since the overhead of constructing an iSCSI PDU may be limited as compared with per-byte operations or squeezing a marker inside the data, which may necessitate a copy or break of the data to allow for the marker, these operations may be moved into the CNC. Via a direct memory access (DMA) engine, the iSCSI PDU may be placed in the CNC in pieces that meet the TCP maximum transmission unit (MTU). If the PDU is larger than the TCP MTU, then the CNC may chop the PDU into MTU size segments. Each section of the PDU may then be encapsulated into a TCP segment. The CNC may account for the marker (e.g., the FIM) and the locations of the header and data digests and may insert them in place for all the segments that combined form the iSCSI PDU.

Some embodiments according to the present invention may benefit from the construction of the iSCSI PDU by the host instead of the on an HBA since the host CPU may be much faster than an embedded CPU and memory on an HBA, may have more memory resources and may be constrained by fewer limitations in constructing the iSCSI PDU at wire speed or faster with low CPU utilization. Consequently, the CNC may be leanly designed and may focus on data transfer acceleration rather than on control.

For a SCSI Write command encapsulated into an iSCSI command, a driver may keep an initiator task tag (ITT), a command sequence number (CmdSN), a buffer tag from the SCSI command and a host location for the data. The driver may use the information to program the CNC such that it may be ready for an incoming R2T. The iSCSI target may reply with an R2T for parts of the data or for the whole buffer. With possibly no software assistance, the CNC may automatically fetch the requested data from the host memory for transmission.

For a SCSI read command encapsulated into an iSCSI command, a driver may keep the IIT, the CmdSN, the buffer tag from the SCSI command and the host location for the data. The driver may use the information to program the CNC such that it may be ready for an incoming DATA_IN.

During reception, as TCP segments are received for a connection that is an iSCSI connection, the CNC may keep track of iSCSI PDU boundaries. In keeping track of the iSCSI PDU boundaries, the CNC may process iSCSI PDU headers or markers (e.g., FIMs) and may receive assistance from drivers. When iSCSI traffic flows in order, the CNC may process one iSCSI PDU header after another to get the type of the PDU and its length. The marker, if used, may be placed in known intervals in the TCP sequence number. If the CNC is looking for the beginning of the next PDU in the TCP byte stream, it may get it from the marker. If the marker is not used, the driver may be of some assistance with out-of-order TCP segments. The driver may re-order the TCP data, may process the iSCSI PDU headers and may then feed the CNC with the next expected TCP sequence number for the next iSCSI PDU.

When the iSCSI PDU boundaries are known, the CNC may locate markers (e.g., FIM, if used) and may remote the markers from the data stream. The marker may not be part of the digest computation. The CNC may compute digests (if used), header and data and compare them to the values found in the incoming PDU. In case of an error, the CNC may flag it and may drop the PDU or may pass it to the iSCSI software for further processing and possible recovery.

For DATA_IN, the CNC may separate the iSCSI PDU header and data. The CNC may use the ITT and the buffer offset to look into a table built when a SCSI Read command was sent. The data portion of the PDU may be stored in a designated buffer based upon, for example, a look-up value from the table. The header may be passed to the driver for further processing such as, for example, state updating.

The CNC may receive an R2T iSCSI command. Using the ITT, the buffer offset and a desired data transfer length, the CNC may fetch data from the host and construct an iSCSI DATA_OUT PDU in response.

The CNC may integrate in it complete RDMA capabilities. RDMA may be used to move data between two machines with minimal software overhead and minimal latency. RDMA may be used, for example, for IPC and for latency sensitive applications. Using RDMA, data transfer may be accelerated and may be separated from the control plane. It may accelerate any application without have to add any application knowledge to the CNC. For example, in support of iSCSI, the CNC might have to parse the iSCSI PDU, keep iSCSI specific state information and follow the iSCSI protocol for generating some actions such as, for example, a DATA_OUT in response to an R2T). RDMA may reduce or eliminate the need for additional application knowledge. Thus, the CNC may accelerate many applications over its RDMA service.

Figure 8:
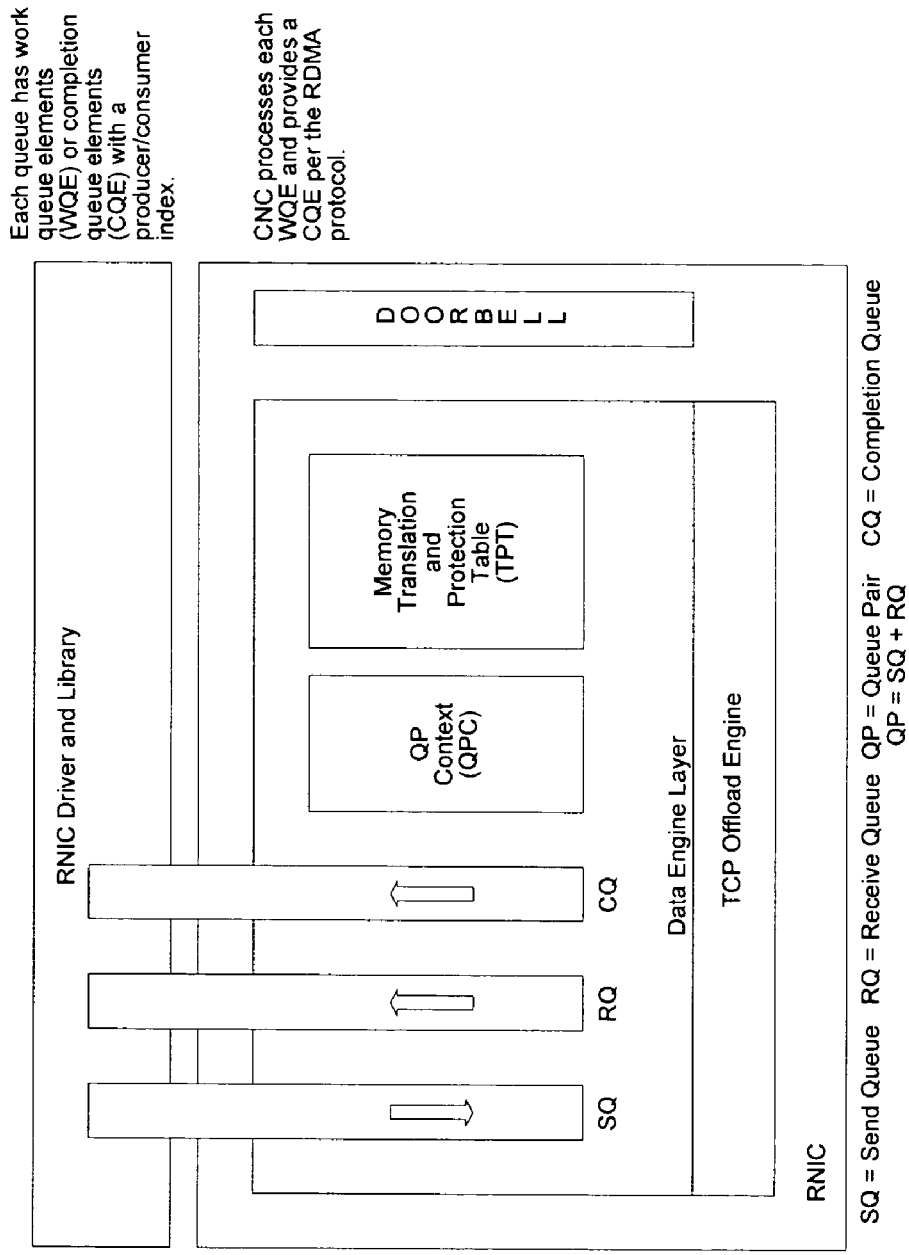
FIG. 8 shows a representation illustrating an embodiment of a remote-direct-memory-access network interface card interface (RI) according to the present invention

An RDMA NIC (RNIC) may support a marker-based upper layer protocol data unit (ULPDU) aligned (MPA) framing protocol such as, for example, MPA/direct data placement (DDP) as well as RDMA. The RNIC may support such protocols while exposing queue interfaces to the software as illustrated in FIG. 8. FIG. 8 shows a representation illustrating an embodiment of RNIC interface (RI) according to the present invention. The RI may include, for example, the RNIC and the RNIC driver and library. In the illustrated queue pair (QP) model, each queue (e.g., a send queue (SQ), a receive queue (RQ) and a completion queue (CQ)) may have work queue elements (WQEs) or completion queue elements (CQEs) with a producer/consumer index. The CNC may process each WQE and may provide a CQE per the RDMA protocol. The CNC implementation may also be quite efficient with respect to the amount of memory and state kept on-chip.

Figure 9:
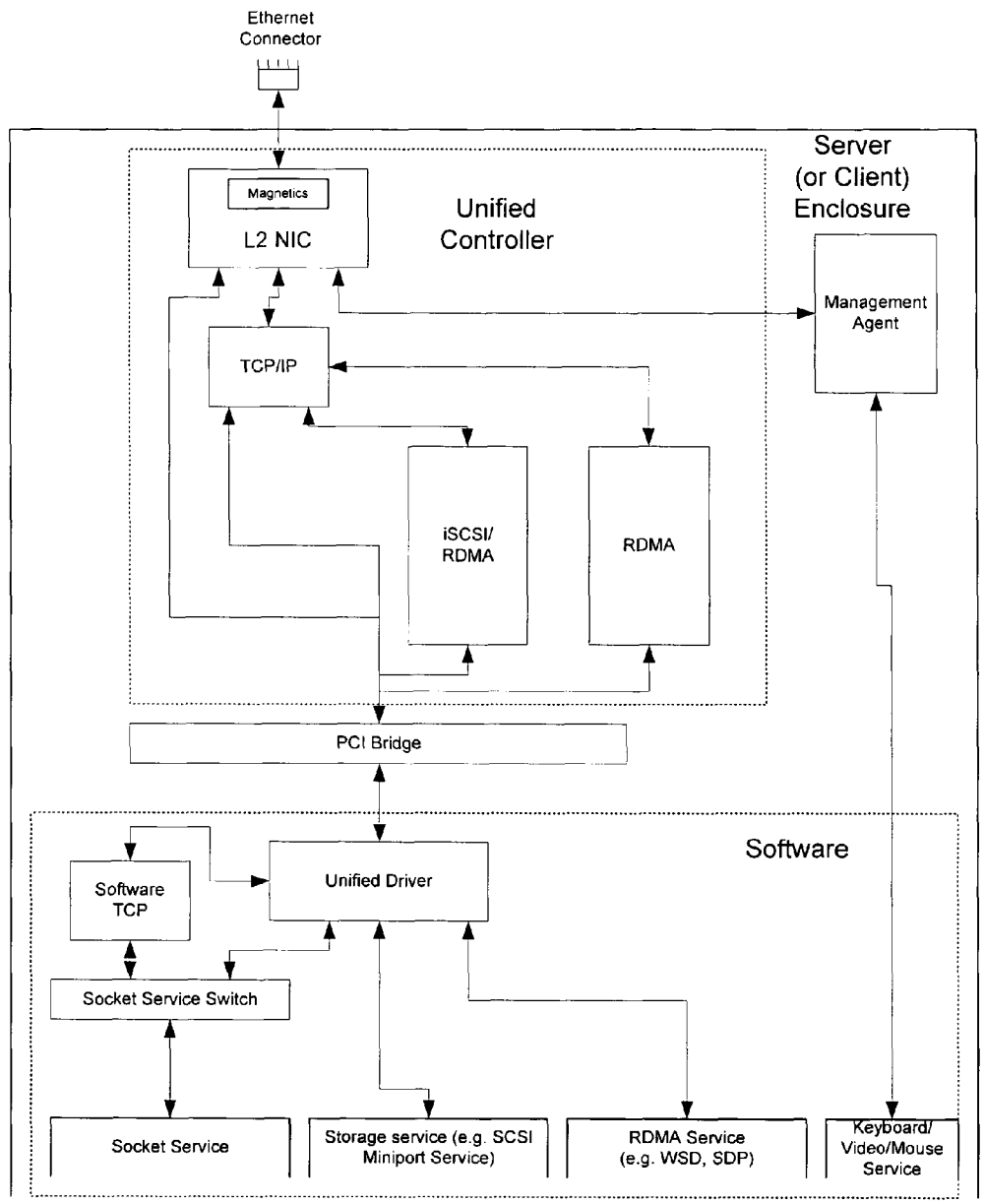
FIG. 9 shows a representation illustrating an embodiment of a server according to the present invention.

The CNC may support multiple types of communications concurrently. For example, the CNC may support Ethernet traffic, TCP/IP traffic, iSCSI traffic, kernel RDMA, user-space RDMA and management traffic as illustrated in FIG. 9. FIG. 9 shows a representation illustrating an embodiment of a server (or client) according to the present invention. The server is shown with a single Ethernet connector coupled to a unified controller. The unified controller may allow for the sharing of particular components such as, for example, an L2 NIC and a TCP/IP processor. The software of the server includes, for example, a unified driver which provides the drivers for the multiple types of communication. The data may also flow along a unified path through the unified driver to the various services.

Figure 14:
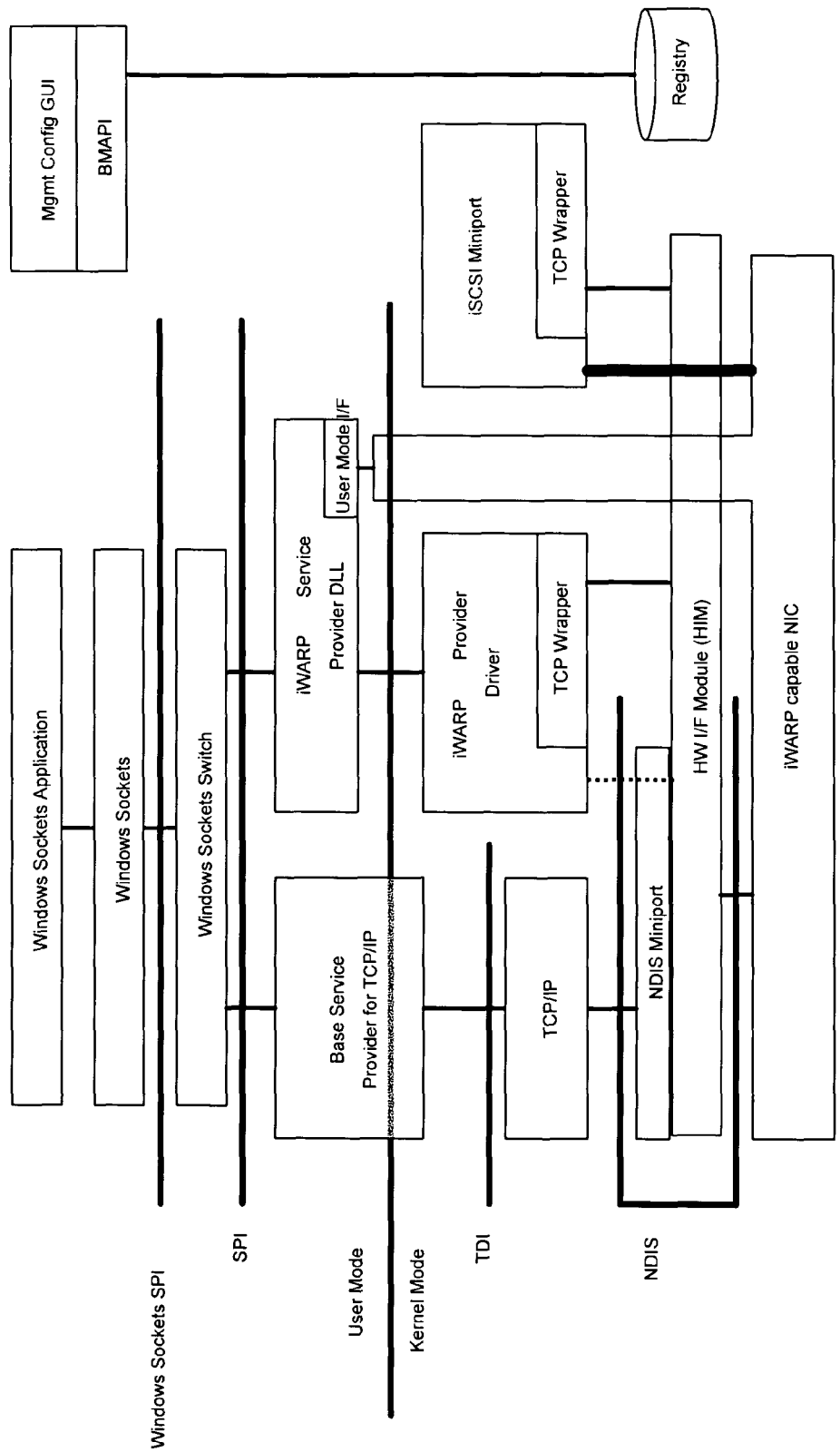
FIG. 14 shows a representation illustrating an embodiment of a CNC software interface according to the present invention.
Figure 15:
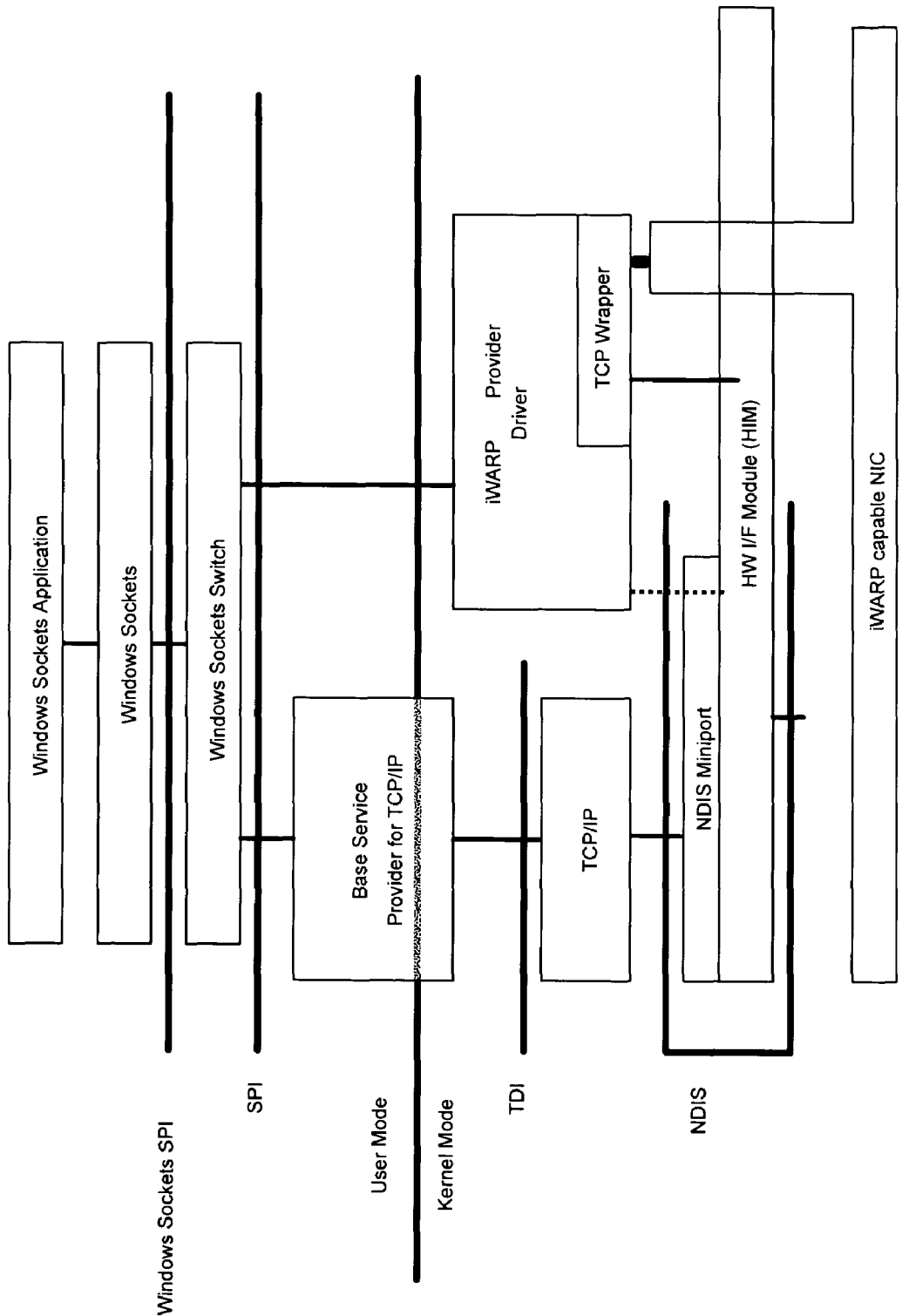
FIG. 15 shows a representation illustrating an embodiment of a CNC kernel remote-direct-memory-access (RDMA) software interface according to the present invention.

FIGS. 14 and 15 show embodiments of support by the CNC of different types of traffic according to the present invention. For example, FIG. 14 shows an embodiment of a CNC software interface according to the present invention. In another example, FIG. 15 shows an embodiment of a CNC kernel RDMA software interface according to the present invention.

Figure 13:
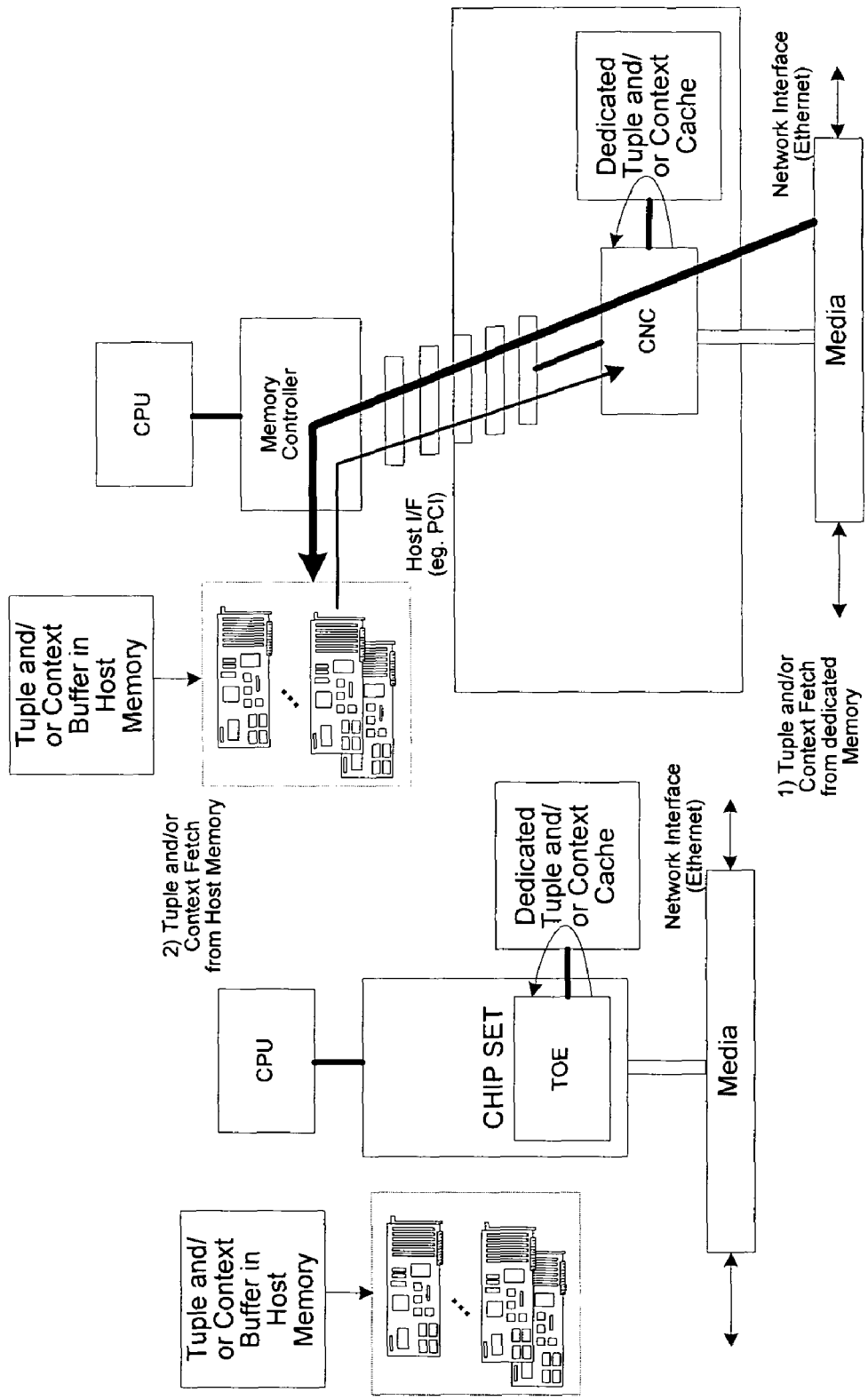
FIG. 13 shows an embodiment of a method for storing and fetching context information according to the present invention.

The CNC may be configured to carry different traffic types on each TCP/IP connection. For every TCP/IP connection supported, the CNC may keep context information as illustrated in FIG. 13. The context information may be dynamically allocated to support any mix of traffic and may be flexible enough to allow for different amounts of resources even among connections of the same type. For example, some RDMA connections may be supported by many memory windows/regions while other RDMA connections may be supported by only a few memory windows/regions. The context information may be adapted to best serve each connection.

Figure 11:
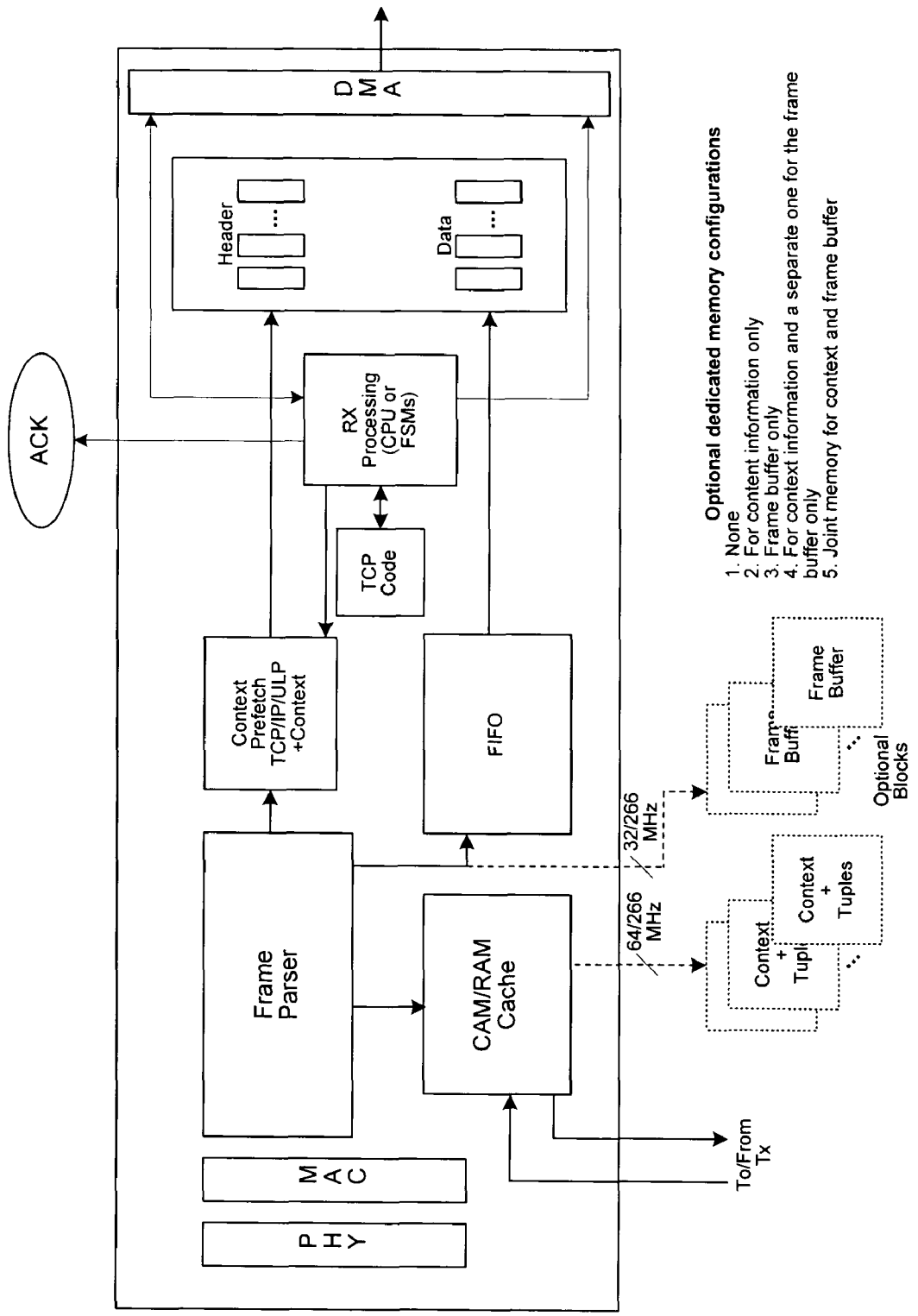
FIG. 11 shows a representation illustrating an embodiment of a TCP offload engine during receive according to the present invention.
Figure 12:
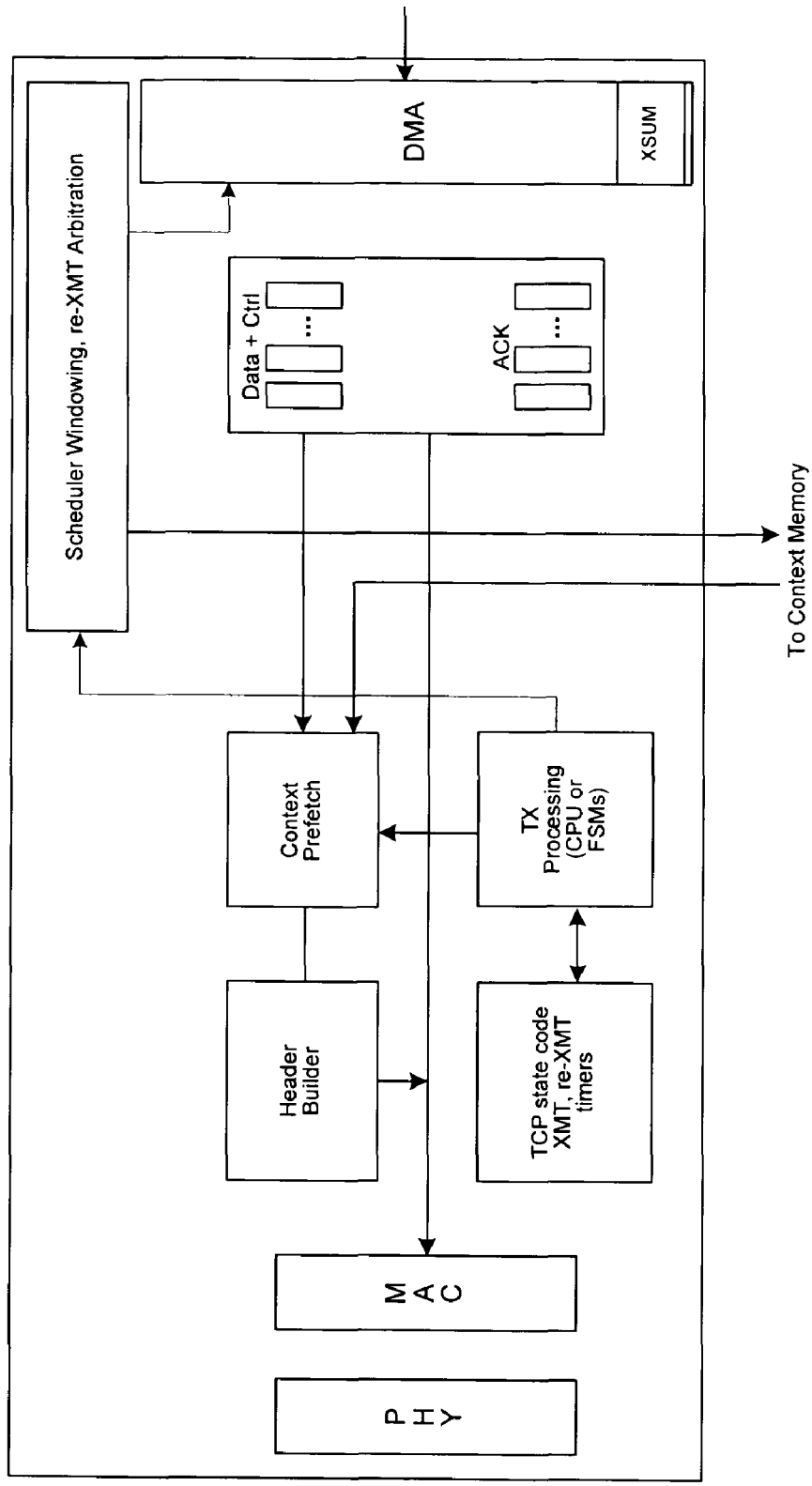
FIG. 12 shows a representation illustrating an embodiment of a TCP offload engine during transmit according to the present invention.

The CNC may integrate communication technologies that were traditionally delivered in separate integrated circuits and typically on separate adapters. The CNC may provide a TCP offload engine. FIGS. 11 and 12 show representation illustrating an embodiment of a TCP offload engine during receive and transmit, respectively, according to the present invention. The CNC may focus on data transfer in the hardware and connection set-up and tear-down in the software. The CNC may also provide iSCSI acceleration in hardware with minimal hardware that may deal with intensive per-byte operations or with accelerations (e.g., performance critical accelerations, R2T). In addition, the CNC may provide full-functionality RDMA with minimal memory foot print and may exhibit lower cast than a other proprietary solutions. A software unified driver architecture may manage the hardware resources and may allocate them to different communications mechanisms. The CNC approach also provides for high versatility mapping of received frames payload to a set of different types of host buffer structures (e.g., physical address, linked lists and virtual addressing). The CNC approach may also allow for simultaneous operation of all of the communication types and for dynamic resource allocation for them.

One or more embodiments according to the present invention may have one or more of the advantages as set forth below.

Some embodiments according to the present invention may provide a unified data path and a unified control path. A special block for each may be provided.

Some embodiments according to the present invention may provide multiple functions supported by a single IP address in a hardware accelerated environment.

Some embodiments according to the present invention may provide an efficient approach toward context memory through, for example, a flexible allocation of limited hardware resources for the various protocols in a hardware accelerated TCP offload engine. In at least one embodiment, the memory may be pooled instead of providing a dedicated resource per function.

Some embodiments according to the present invention may provide a single TCP stack with hardware acceleration that supports multiple protocols.

Some embodiments according to the present invention may provide acceleration of converged network traffic that may allow for the elimination of a multiple deep packet lookup and a series of dedicated IC to process each of the protocols separately.

Some embodiments according to the present invention may provide for a low cast acceleration of converged network traffic by a single integrated circuit into multiple host software interfaces and may provide multiple distinct existing services.

Some embodiments according to the present invention may provide for a low cost acceleration of converged network traffic by a single integrated circuit into a single bus interface (e.g., peripheral component interface (PCI)) on a host hardware and may provide multiple distinct existing services. Multiple separate bus slots may be eliminated and low cost system chipsets may be allowed.

Some embodiments according to the present invention may provide for single chip that may not need an external memory or a physical interface and that may lower the cost and foot print to allow penetration into price sensitive markets. The single chip concept may allow for substantially higher volume than existing traditional designs.

Figure 10:
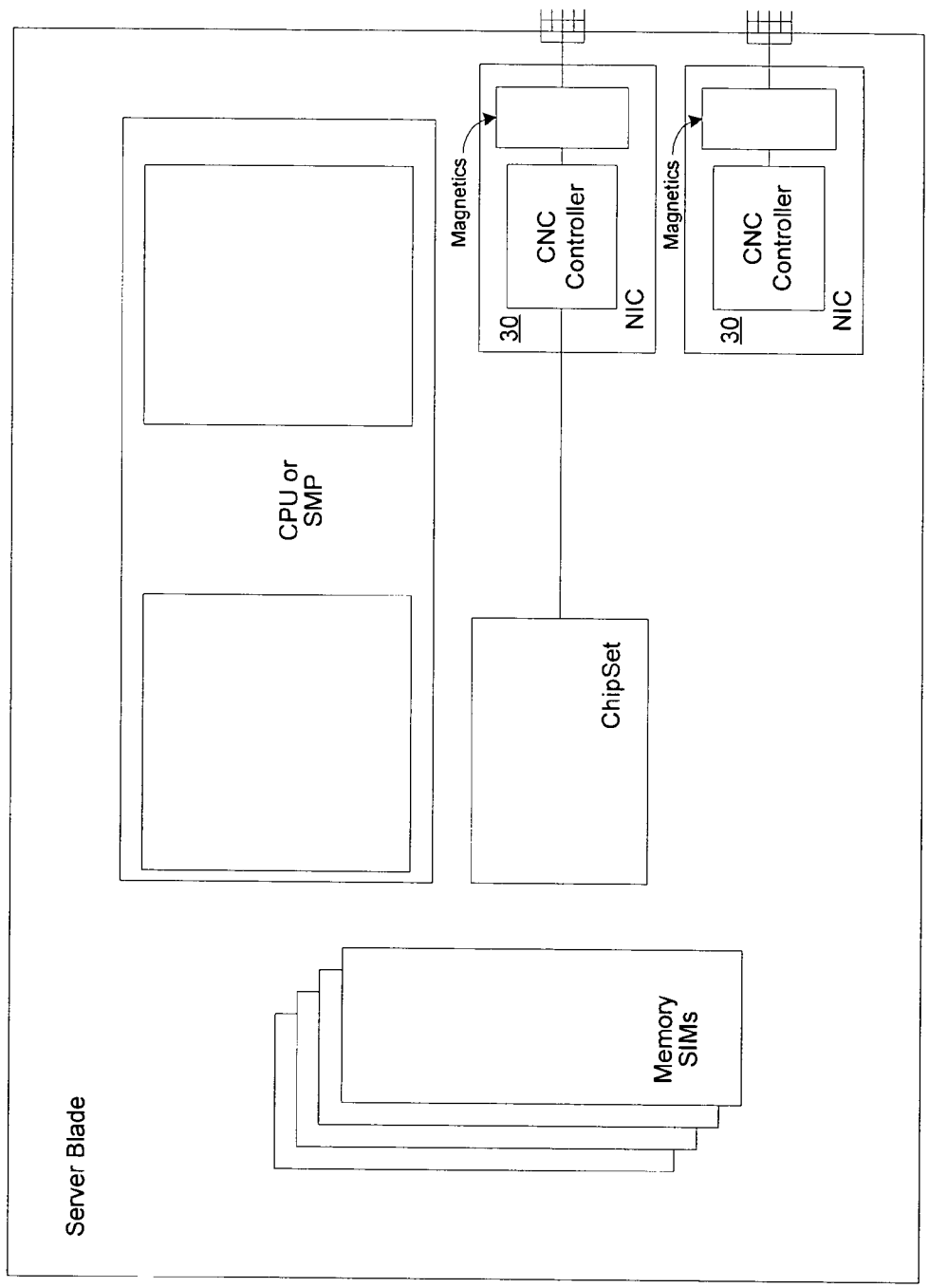
FIG. 10 shows a representation illustrating an embodiment of a server blade according to the present invention.

Some embodiments according to the present invention may provide higher density servers via, for example, server blades adapted for the CNC approach, by converging all of the communications interfaces for the server on one connector. All of the server connectivity may be funneled through one connection on the back plane instead of multiple connections. The minimal footprint of the CNC may provide benefits especially in a space constrained environment such as servers (e.g., Server Blade servers). FIG. 10 shows a representation illustrating an embodiment of a server blade according to the present invention.

Some embodiments according to the present invention may eliminate the need for a plurality of registered jack-45 (RJ-45) connectors, thereby saving the cost of the connectors and the cabling along with alleviating the need to run multiple, twisted-pair cables in a physically constrained environment.

Some embodiments according to the present invention may provide functionality and integration, for example, by supporting all of the communication needs of the server. The need for separate IPC adapters and separate storage adapters may be reduced or eliminated. By using a single chip, limited real estate and one connector in a server, communications cost may be substantially reduced.

Some embodiments according to the present invention may provide high density servers by allowing the removal of functionality from each server. Density may be increased, for example, by eliminating the need for hard disk, any storage adapter on each server or the need for a separate KVM for each server.

Some embodiments according to the present invention may provide high density servers with minimal power consumption by using smaller power supplies and by minimizing the need for cooling that may allow for smaller mechanical form factors.

Some embodiments according to the present invention may provide for low cost servers with low cost CPUs that may deliver the same performance as may be expected from high cost CPUs with non-accelerated network controllers.

Some embodiments according to the present invention may provide for the integration of server management. The integration of server management may eliminate, for example, the need for a dedicated connector and may save the cost for a three-way switch typically used to split the management traffic from the rest of the communication traffic.

Some embodiments according to the present invention may replace the functionality provided by four or more separate adapters and may eliminate the need for a dedicated L4/L5 switch in front of them.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network communication system, comprising:
    a single integrated convergent network controller (ICNC) chip; and
    a single Ethernet connector for handling a plurality of layer 2/layer 4/layer 5 (L2/L4/L5) types of network traffic transported via a single fabric, wherein:
        the single Ethernet connector is coupled to the single ICNC chip;
        the single fabric is a physical link coupled to a plurality of servers;
        the single ICNC chip comprises an L2/L4/L5 adapter operable to process the plurality of L2/L4/L5 types of network traffic for the plurality of servers, wherein the plurality of L2/L4/L5 types of network traffic comprise: network traffic, storage traffic, interprocess communication (IPC) traffic and cluster traffic, which are transported via the single fabric, wherein the network traffic comprises Internet or Ethernet traffic, and wherein the storage traffic comprises traffic from storage devices accessible via a network.

2. The network communication system according to claim 1, wherein:
    the plurality of servers comprises a blade server, and the single ICNC chip is part of a blade mounted in the blade server.

3. The network communication system according to claim 2, wherein the blade server has a single Internet protocol (IP) address.

4. The network communication system according to claim 1, wherein the plurality of servers is part of a data center, and the data center comprises a plurality of other servers coupled to each other via the single fabric.

5. A method for communication, the method comprising:
    in a data center:
        accessing a storage system over a single fabric, wherein said single fabric is a physical link comprises a single layer 2 (L2) connector coupled to a single integrated convergent network controller (ICNC) chip, wherein:
            the ICNC chip comprises an L2/L4/L5 adapter operable to process a plurality of layer 2/layer 4/layer 5 (L2/L4/L5) types of traffic, wherein the plurality of L2/L4/L5 types of network traffic comprise: network traffic, storage traffic, interprocess communication (IPC) traffic and cluster traffic; and
        accessing one or more of a cluster and a network over said single fabric, wherein the network traffic comprises Internet or Ethernet traffic, and wherein the storage traffic comprises traffic from storage devices accessible via a network.

6. The method according to claim 5, wherein said accessing of said storage system, over said single fabric are performed over a single Ethernet connector of a server in the data center.

7. The method according to claim 5, wherein said single integrated convergent network controller chip coupled to the single Ethernet connector has a single Internet protocol (IP) address.

8. A system for communication, the system comprising:
    a single integrated convergent network controller (ICNC) chip, said ICNC chip comprises an L2/L4/L5 adapter that enables processing functionalities of a plurality of layer 2/layer 4/layer 5 (L2/L4/L5) types of traffic that are received via a single layer 2 (L2) connector that is communicatively coupled to a plurality of servers via a single physical link fabric, wherein the plurality of L2/L4/L5 types of network traffic comprise: network traffic, storage traffic, interprocess communication (IPC) traffic and cluster traffic, wherein the network traffic comprises Internet or Ethernet traffic, and wherein the storage traffic comprises traffic from storage devices accessible via a network.

9. The system of claim 8, wherein said single integrated convergent network controller chip comprises a layer 2 network interface card (L2 NIC), a transmission control protocol (TCP) processor, an iSCSI processor, a remote direct memory access (RDMA) processor and a Management Agent processor.

10. A method for communication, the method comprising:
    receiving a plurality of layer 2/layer 4/layer 5 (L2/L4/L5) types of traffic at a single layer 2 (L2) connector that is communicatively coupled to a plurality of servers via a single physical link fabric; and
    processing the plurality of L2/L4/L5 types of traffic for the plurality of servers via a single integrated convergent network controller (ICNC) chip, said ICNC chip comprises an L2/L4/L5 adapter that enables processing functionalities of the plurality of,
    wherein the plurality of L2/L4/L5 types of network traffic comprise: network traffic, storage traffic, interprocess communication (IPC) traffic and cluster traffic, wherein the network traffic comprises Internet or Ethernet traffic, and wherein the storage traffic comprises traffic from storage devices accessible via a network.

11. The method of claim 10, wherein said single ICNC chip comprises a layer 2 network interface card (L2 NIC), a transmission control protocol (TCP) processor, an iSCSI processor, a remote direct memory access (RDMA) processor and a Management Agent processor.

* * * * *